United States Patent [19]

Toriu et al.

[11] Patent Number: 4,602,307
[45] Date of Patent: Jul. 22, 1986

[54] COMPOUND TYPE MAGNETIC HEAD

[75] Inventors: Jirou Toriu; Hiroshi Yamamoto; Shoyu Watanabe, all of Amagasaki, Japan

[73] Assignee: Mitsubishi Denki Kabushiki Kaisha, Tokyo, Japan

[21] Appl. No.: 474,340

[22] Filed: Mar. 11, 1983

[51] Int. Cl.$^4$ ............................. G11B 5/12; G11B 5/22
[52] U.S. Cl. ..................................... 360/125; 360/119
[58] Field of Search ............... 360/125, 126, 127, 110, 360/119–120, 123

[56] References Cited

U.S. PATENT DOCUMENTS

| 4,115,827 | 9/1978 | Gooch | 360/125 |
| 4,387,410 | 6/1983 | Takanohashi et al. | 360/125 |
| 4,404,608 | 9/1983 | Yasuda et al. | 360/125 |
| 4,475,137 | 10/1984 | Yasuda et al. | 360/125 |

FOREIGN PATENT DOCUMENTS

| 0191821 | 11/1982 | Japan | 360/125 |

OTHER PUBLICATIONS

"Sendust Head for Video Cassette Recorders", Sanyo Technical Review, vol. 14, No. 2, Aug. 1982, pp. 66–73.
"Ultra-High Density Recording with Sendust Video Head and High Coercive Tape", IEEE Transactions on Magnetics, vol. Mag-17, No. 6, Nov., 1981, pp. 3114–3116.

*Primary Examiner*—John H. Wolff
*Assistant Examiner*—David J. Severin
*Attorney, Agent, or Firm*—Lowe, Price, Leblanc, Becker & Shur

[57] ABSTRACT

A compound type magnetic head comprising a main core (11) made of a magnetic material high in saturation flux density and low in inherent resistance, such as sendust or amorphous material and two auxiliary cores (12) sandwiching the main core (11) therebetween. The auxiliary cores (12) each consist of a first member made of a material high in inherent resistance such as ferrite and a second member made of a low melting point glass portion 42 formed on the front side of the first member, namely on the side abutting against the magnetic tape.

1 Claim, 7 Drawing Figures

COMPOUND TYPE MAGNETIC HEAD

BACKGROUND OF THE INVENTION

1. Field of the Invention

This invention relates to a compound type magnetic head and more particularly to a compound type magnetic head having a core and auxiliary cores and capable of corresponding to a high coercive medium.

2 Description of the Prior Art

As well known, in order to sufficiently magnetize a magnetic recording medium of a high coercive medium such as a metal tape and vacuum deposited type, a head core sufficiently high in saturation flux density is required. To meet this requirement, alloy magnetic materials such as sendust, amorphous material have been developed. But the alloy magnetic materials are not free from the problem that the materials are low in inherent resistance, reduced in magnetic permeability by eddy current loss in the video frequency zone and reduced in the reproducing efficiency of a magnetic head.

In order to solve the above described problem of the magnetic head of an alloy magnetic material, a compound type magnetic head consisting of a main core made of an alloy magnetic material and auxiliary cores made of ferrite higher in inherent resistance than the alloy magnetic material has heretofore been proposed. Namely, the main core containing a front gap is formed of an alloy magnetic material and a portion other than the neighborhood of the gap occupying a major part of a magnetic path is formed of ferrite high in inherent resistance. The compound type magnetic head of this type is disclosed, for example in Japanese Utility Model Registration Application No. 83051/1971 (Japanese Utility Model Publication Laid Open to Public Inspection No. 39918/1973).

FIG. 1 is a perspective view of a conventional compound type magnetic head of the type described above.

FIG. 2 is an exploded view of the compound type magnetic head in FIG. 1. The compound magnetic head 10 comprises a main core 11 and two auxiliary cores sandwiching both sides of the main core 11 therebetween. The main core 11 is made of an alloy magnetic material such as sendust, while the other auxiliary cores 12 are made of ferrite. The main core 11 having a winding opening 21 formed therein is formed by depositing a main core half 11a to a main core half 11b with silver solder at deposit portions 22a and 22b. On that side 13 of the main core 11 against which a magnetic tape abuts is formed a head gap 23 made of $SiO_2$ sputtering. On the other hand, the auxiliary core 12 having a winding opening 21 formed therein is formed by glass depositing auxiliary core halves 12a and 12b at deposit portions 24a and 24b. On those sides of the auxiliary cores 12 against which a magnetic tape abuts is formed a pseudo-gap 26 of a pseudo-gap length l. The conventional compound type magnetic head 10 shown in FIG. 1 is manufactured in the manner that a main core and auxiliary cores of block deposit material (not shown) extending in the direction of track width of a magnetic tape are cut thin and thereafter is ground, laid one over the other, bonded to each other with an organic adhesive agent and fixed to a specified head holder (not shown) and a magnetic tape abutting face 13 is polished as with a polishing tape.

In the conventional compound type magnetic head of the construction described above, the main core 11 made of sendust high in saturation flux density works effectively on the neighborhood of the gap 23 at which saturation of the core is called into question at the time of recording. On the other hand, the auxiliary cores made of ferrite high in magnetic permeability work effectively on a major part of a magnetic path except the pseudo-gap length l at the time of reproduction at which saturation of the core does not come into question. Accordingly, a magnetic head higher in reproducing efficiency is obtained in proportion as the pseudo-gap length l is shorter. The pseudo-gap length l used is in the range of 50 to 100 μm. But because the pseudo-gap 26 is constructed so as to abut against the magnetic tape, the pseudo-gap not only detects a main track signal responsive to the gap 23 of the main core 11 but also detects a signal coming from the track near the main track such that so-called crosstalk is produced. This crosstalk can be reduced to a certain degree by providing azimuth between the gap 23 of the main core 11 and the pseudo-gap 26 of the auxiliary cores 12 or increasing the size of the pseudo-gap length l. But it cannot be said that this can essentially solve the problem of noise being increased by the signal being detected at the edge portion of the pseudo-gap 26.

On the other hand, sendust material of the main core 11 is a material lower in hardness and more liable to wear away than the ferrite constituting the auxiliary cores 12. Accordingly, the main core 11, while making repeated contact with the magnetic tape, is more heavily worn away than the auxiliary cores 12 and is brought into a sunken state, with the result that there is produced a difference in the level of the core surface 13 abutting against the magnetic tape. This amount of sinking is on the order of submicron. Accordingly, in the reproduction of a video signal of the order of a wavelength of 1 μm spacing loss due to this amount of sinking is unignorably large and brings about a great reduction in short wavelength characteristic. Especially, the effects by the difference in level are conspicuous when the pseudo-gap length l measures less than 100 μm. If the pseudo-gap length l is increased, the effects by this level difference can be alleviated to a certain degree, but reproducing efficiency is reduced as described above.

As above, since the conventional compound type magnetic head is of the construction in which the pseudo-gap abuts against the magnetic tape, it is impossible to completely prevent crosstalk, and there is a disadvantage of the difference in the level of the magnetic head pseudo-gap abutting against the magnetic tape bringing about a substantial reduction in short wavelength recording and reproducing characteristics.

On the other hand, a treatise entitled "Newly developed sendust video head for high coercive tape" printed in "IEEE TRANSACTIONS ON MAGNETICS, Vol. Mag-16, No. 5 September 1980" discloses a compound type magnetic head having the main magnetic core of Sendust sandwiched between block materials of nonmagnetic material. But this prior art merely discloses the magnetic head of the construction in which an alloy magnetic material is sandwiched between nonmagnetic materials. Accordingly, the prior art cannot overcome the disadvantage of the alloy magnetic material due to low inherent resistance, namely the disadvantage of a reduction in magnetic permeability due to eddy current loss in the video frequency zone and the resulting reduction in the reproducing efficiency of the magnetic head.

SUMMARY OF THE INVENTION

Accordingly, a primary object of the invention is to provide a compound type magnetic head capable of eliminating the disadvantages described above, solving the problems of crosstalk and spacing loss, and high density magnetic recording and reproducing.

Accordingly, to the extensive field of this invention, there is provided a compound type magnetic head designed to record a signal on a high coercive tape or reproduce the signal recorded thereon and made of a magnetic material high in saturation flux density and low in inherent resistance and comprising a main core having a winding opening and a gap formed on the surface side against which the magnetic tape abuts and auxiliary cores sandwiching both sides of the main core therebetween, wherein the auxiliary cores have a winding opening in the position corresponding to the winding opening of the main core and comprise a first member made of a material high in inherent resistance and a second member bonded to the first member so as to be positioned on the side abutting against the magnetic tape and made of a material lower in hardness than the main core.

As the material which constitutes the main core may be selected various alloy magnetic materials such as sendust and amorphous materials.

Preferably, the second member of the auxiliary cores may be formed arcuate in such a manner that the entire surface of the member opposing the magnetic tape abuts against the magnetic tape correctly. In addition, the auxiliary cores are formed arcuate in such a manner that the surface of the auxiliary cores opposing the magnetic tape is formed arcuate and out of the arcuate portion at least the portion which abuts against the magnetic tape is formed of the second member and the other portion is formed of the first member. In a more specific embodiment of the invention, the first member is made of ferrite and the second member is made of low melting point glass.

These and other objects and features of the invention will become more apparent from the following detailed description given in conjunction with the accompanying drawings.

DESCRIPTION OF THE PREFERRED EMBODIMENTS

Figure 1:
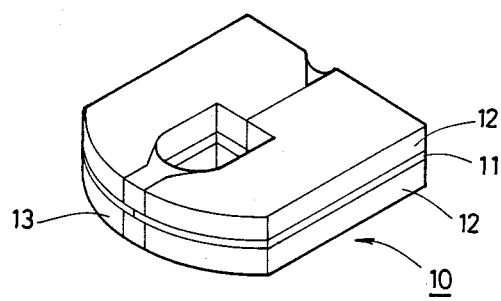
FIG. 1 is a perspective view of a conventional compound type magnetic head.
Figure 2:
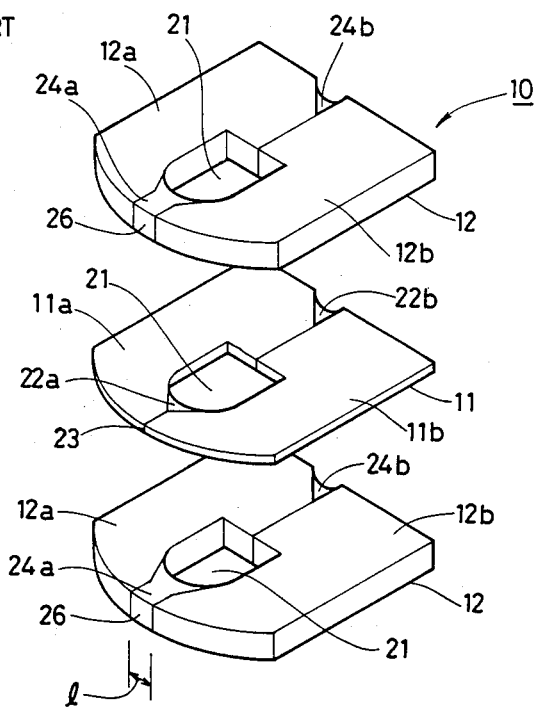
FIG. 2 is an exploded view of the conventional compound type magnetic head.
Figure 3:
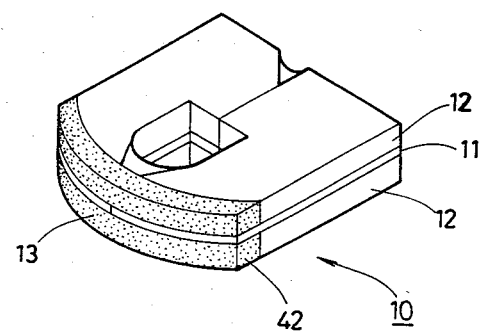
FIG. 3 is a perspective view of a compound type magnetic head according to one embodiment of the invention.

FIG. 3 is a perspective view showing a compound type magnetic head according to one embodiment of the invention. Referring to FIG. 3, the compound type magnetic head 10 comprises a main core 11 and two auxiliary cores 12, 12 sandwiching the main core 11 therebetween. The main core 11 is made of a magnetic material high in saturation flux density and low in inherent resistance. As a magnetic material of the type described is mentioned for example an alloy magnetic material such as sendust or amorphous substances. As apparent from FIG. 4, the main core 11 is formed such that a main core half 11a and a main core half 11b respectively having notches are deposited to each other at deposit portions 22a and 22b, and at this time a winding opening 21 is formed by each notch of each main core half 11a and each main core half 11b. On that side surface of the main core 11 against which the magnetic tape abuts is formed a gap 23. The gap is formed, for example, a sputtering film of $SiO_2$.

On the other hand, each of the auxiliary cores 12 comprises a first member 14 having an auxiliary core half 12a and an auxiliary core half 12b formed by glass depositing on deposit portions 24a and 24b and a second member 42 made of a material lower in hardness than the main core and bonded to the front side of the first member 14, namely to the portion which abuts against the magnetic tape. The second member 42 may be made as of low melting point glass.

Referring now to the function of the embodiment shown in FIG. 3, the main core 11 is made of sendust or amorphous material. The hardness of the main core 11 is on the order of 500 Hv, while the low melting point glass portion 42 formed at the front end of each of the auxiliary cores 12, 12 is less than 500 Hv in hardness. Accordingly, repeated abutment of the magnetic tape against this compound type magnetic head according to this embodiment provides no possibility of the main core 11 being worn away more heavily than the low melting point glass portion 42 to thereby cause spacing loss. On the contrary, the low melting point portion 42 lower in hardness is worn away and sunk and the main core 11 will rise. Accordingly, desirable contact between the magnetic head 10 and the magnetic tape at a gap portion 23 is ensured to thereby attain improvement of short wavelength characteristic. Since the pseudo-gap 26 of the auxiliary core 12 (see FIG. 4) is of the construction in which the gap does not abut against the magnetic tape, crosstalk from the neighboring tracks is also improved in a substantial degree. In addition, when the low melting point portion 42 is less than 100 μm in thickness 41, the portion to which the main core 11 in the neighborhood of the gap 23 is relates is increased, but the portion becomes very small in percentage. Accordingly, in the compound type magnetic head in the embodiment illustrated, the auxiliary core 12 having a greater part of the magnetic path thereof formed of ferrite large in sectional area and high in magnetic permeability works efficiently in the same manner as in the conventional head and can achieve high reproducing efficiency.

Figure 4:
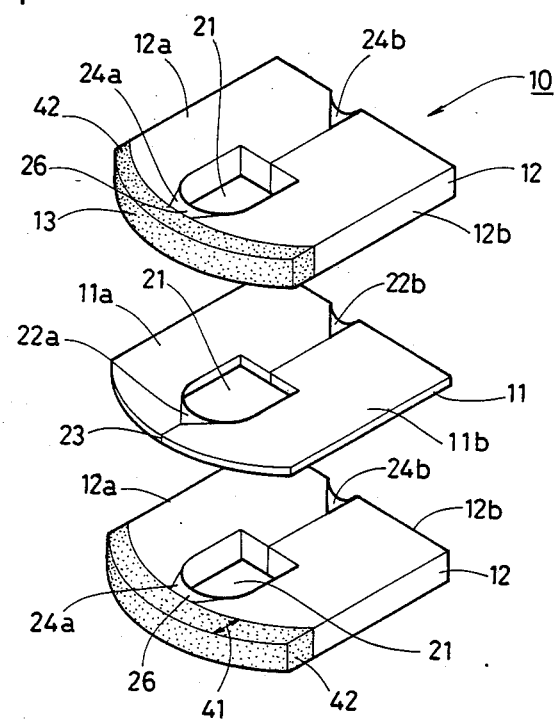
FIG. 4 is an exploded view of the compound type magnetic head according to one embodiment of the invention.
Figure 5:
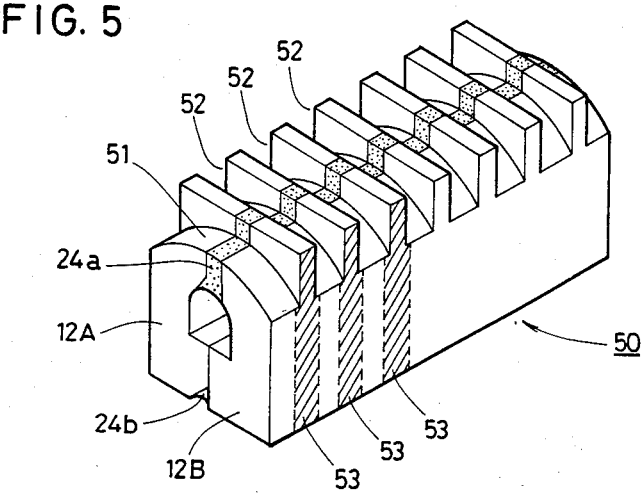
FIG. 5 is a perspective view of an auxiliary core deposited block body of the compound type magnetic head according to one embodiment of the invention.
Figure 6:
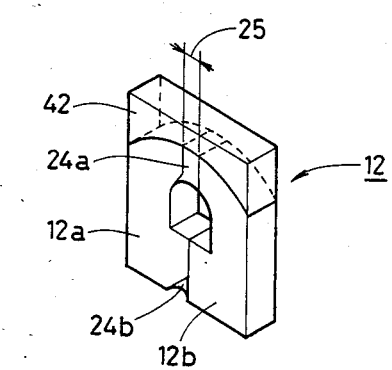
FIG. 6 is a perspective view of the auxiliary core cut off from the auxiliary core deposited block body shown in FIG. 5.

A description will now be given of steps of manufacturing the auxiliary core 12 according to the embodiment of the invention in FIG. 3 with reference to FIGS. 5 and 6. First, a deposited block body 50 is prepared. The body 50 is obtained by glass depositing blockshaped auxiliary core halves 12a and 12b at deposit portions 24a and 24b. The glass deposit is carried out by well-known deposit means by use of high melting point glass. Grooves 52 are formed at equal intervals in the deposit block 50. The bottom surface 51 of each of the grooves 52 is so made as to be on substantially the same curved surface with the abutment surface of the magnetic head. In the grooves 52 is molded low melting point glass lower in softening point than the glass constituting the deposit portions 24a and 24b. After surplus low melting point glass has been removed and after a portion 53 to be removed has been cut off and removed, the molded low melting point glass is subjected to processing such as thickening, polishing. In this manner, the auxiliary core 12 shown in perspective in FIG. 6 is obtained. The auxiliary cores 12 thus obtained are laid one over the other with a main core 11 sandwiched therebetween, as shown in FIG. 4 and are bonded together to provide a compound type magnetic head 10 in a finished form as shown in FIG. 3.

In the compound type magnetic head according to the embodiment in FIG. 3, the front side of the low melting point glass portion 42 constituting the second member, namely the surface which abuts against the magnetic tape is formed arcuate over the entire surface thereof. Consequently, the abutment of the head portion against the magnetic tape is carried out more smoothly.

Figure 7:
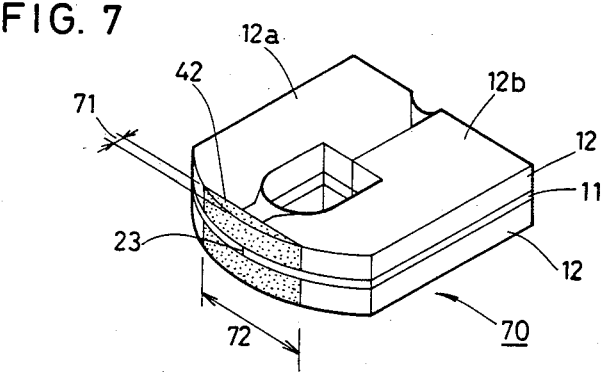
FIG. 7 is a perspective view of a compound type magnetic head according to another embodiment of the invention.

FIG. 7 is a perspective view of a magnetic head according to another embodiment of the invention. As apparent from FIG. 7, the front sides of the auxiliary cores 12a and 12b, namely the front side of the first member is formed flat. To the front of this flat portion is bonded the low melting point glass portion 42 as the second member. The front portion of this glass portion 42, namely the side surface against which the magnetic tape abuts is formed arcuate in the same manner as in the preceding embodiment in FIG. 3, so as to provide more smooth contact with the magnetic tape. In manufacturing the auxiliary cores 12 in this embodiment, it is only necessary in forming grooves 52 in a deposit block body 50 (see FIG. 5) to form the bottom surfaces 51 of the grooves 52 on the flat surface parallel to the upper surface of the block body 50. In addition, when the thickness 71 of the low melting point glass portion 42 (see FIG. 7) is selected to be more than 50 $\mu$m, the width 72 of the glass portion 42 becomes more than 1 mm because the diameter of the tip is on the order of 20 mm in the case of the video head. Accordingly, even if there is produced a difference in level between the main core 11 and the glass portion 42 of the auxiliary core 12, spacing of the head gap 23 does not come into question. Furthermore, only the tip portion of the magnetic head in the neighborhood of the gap 23 abuts against the magnetic tape, with the result that crosstalk due to the pseudo-gap is not called into question.

Also, in the embodiment shown, a description has been given of the case wherein the gap 23 has not azimuth, but it should be understood that the invention is applicable also to the gas having azimuth as the video head has.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a magnetic head for recording a signal on a magnetic tape of high coerciveness for reproducing the signal recorded thereon, a compound type magnetic head comprising:

a main core and two auxiliary cores sandwiching both sides of said main core therebetween, said main core being made of a magnetic material high in saturation flux density and low in inherent resistance and having a winding opening and a gap formed on the side against which said magnetic tape abuts, said auxiliary cores each consisting of a first member and a second member, said first member having a winding opening in the position corresponding to said winding opening of said main core, a gap narrower than the maximum width of the winding opening thereof at a position opposing to the gap of said main core, and glass members disposed within the gap thereof, and being made of a material high in inherent resistance, said second member being made of glass bonded to said first member so as to be located on the side against which said magnetic tape abuts and being made of a material lower in hardness than said main core, said first member has two first member halves secured by glass depositing, and glass members disposed within said gap are used for glass depositing, said second member is made of a material having a lower melting point than the glass members disposed within the gap of said first member.

* * * * *